United States Patent
Cheng et al.

(10) Patent No.: US 8,495,733 B1
(45) Date of Patent: Jul. 23, 2013

(54) CONTENT FINGERPRINTING USING CONTEXT OFFSET SEQUENCES

(75) Inventors: Yun-Chian Cheng, Merced, CA (US); Ming-Tai Chang, Taipei (TW); Chung-Chih Wu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 755 days.

(21) Appl. No.: 12/410,658

(22) Filed: Mar. 25, 2009

(51) Int. Cl.
*G06F 11/00* (2006.01)
*G06F 17/15* (2006.01)

(52) U.S. Cl.
USPC .......................................... 726/22; 708/422

(58) Field of Classification Search
USPC ..................................................... 726/22–25
See application file for complete search history.

(56) References Cited

U.S. PATENT DOCUMENTS

| 7,065,544 | B2 * | 6/2006 | Moreno | 708/422 |
| 7,107,617 | B2 * | 9/2006 | Hursey et al. | 726/22 |
| 7,475,071 | B1 * | 1/2009 | Liu et al. | 1/1 |
| 7,685,637 | B2 * | 3/2010 | Zhao et al. | 726/22 |
| 7,810,155 | B1 * | 10/2010 | Ravi | 726/22 |
| 7,877,801 | B2 * | 1/2011 | Repasi et al. | 726/22 |
| 7,966,658 | B2 * | 6/2011 | Singh et al. | 726/22 |
| 8,141,152 | B1 * | 3/2012 | Hwang et al. | 726/22 |
| 2007/0085716 | A1 * | 4/2007 | Bar-Yossef et al. | 341/87 |
| 2007/0180537 | A1 | 8/2007 | He et al. | |
| 2007/0217648 | A1 | 9/2007 | Muehlbauer | |

OTHER PUBLICATIONS

Aleksander Kotcz, et al. "Hardening Figerprinting by Context", 7 sheets, CEAS 2007—Fourth Conference on Email and Anti-Spam, Aug. 2-3, 2007, Mountain View, California.
A. Blumer, et al. "The Smallest Automation Recognizing the Subwords of a Text", 1985, pp. 31-35, Theoretical Computer Science 40, Elsevier Science Publishers B.V., North-Holland.

* cited by examiner

*Primary Examiner* — Saleh Najjar
*Assistant Examiner* — Feliciano Mejia
(74) *Attorney, Agent, or Firm* — Okamoto & Benedicto LLP (57) ABSTRACT

One embodiment relates to a computer-implemented process of content fingerprinting. A context and a content for fingerprinting are received. The context comprises a set of context components for use in generation of content fingerprints. The content includes instances of at least some of the context components. The content is processed to generate context offset sequences, and a fingerprint for the content is formed from at least a portion of the context offset sequences. Another embodiment relates to a computer-implemented process for comparing a target content against a pool of contents. The process includes constructing an automata data structure based on the fingerprints in the pool. Context offset sequences of a target fingerprint are scanned against the automata data structure to determine matched offset subsequences. Other embodiments, aspects and features are also disclosed.

18 Claims, 7 Drawing Sheets

CONTENT FINGERPRINTING USING CONTEXT OFFSET SEQUENCES

BACKGROUND

1. Field of Art

The present invention generally relates to the field of content fingerprinting with application, for example, to the areas of data leakage prevention, anti-spam, URL filtering, and malicious code detection (anti-malware).

2. Description of the Related Art

The present invention may be applied to various areas of computer and information security, including the areas of data leakage prevention, malicious code detection (anti-malware), anti-Spam, and URL filtering, for example.

Data leakage prevention systems are becoming more important for enterprise computing systems. Serious information leakage accidents have caused substantial losses and have damaged corporate images. Such accidents currently occur one after the other. In addition, regulations promulgated by governments require enterprises to properly protect their digital information from leaking.

Computer viruses, worms, Trojans, rootkits, and spyware are examples of malicious codes that have plagued computer systems throughout the world. Although there are technical differences between each type of malicious code, malicious codes are also collectively referred to as malware or "viruses." Malware scanning or "antivirus" products for protecting computers against malicious codes are commercially available. Experienced computer users have installed some form of antivirus in their computers. A typical malware scanning (anti-malware) product includes a scan engine and a pattern file. The pattern file comprises patterns for identifying known malicious codes. To check a file for malicious code, the scan engine opens the file and compares its content to patterns in the pattern file. The pattern file needs to be updated to address newly discovered malicious codes. As the number of known malicious codes increases, so does the size of the pattern file. The larger the pattern file, the more memory and processing resources are consumed to perform malicious code scanning.

Spam refers to unsolicited bulk messages which are undesirable and a nuisance. Forms of spam include e-mail spam, instant messaging spam, mobile phone messaging spam, and others. Techniques to prevent or combat spam may referred to as anti-spam techniques.

Filtering of universal resource locators (URLs) may be used to provide a protective mechanism against web-based security threats. In addition, URL filtering may be used for workplace compliance or parental supervision of web browsing.

SUMMARY

One embodiment relates to a computer-implemented process of content fingerprinting. A context and a content for fingerprinting are received. The context comprises a set of context components for use in generation of content fingerprints. The content includes instances of at least some of the context components. The content is processed to generate context offset sequences, and a fingerprint for the content is formed from at least a portion of the context offset sequences.

Another embodiment relates to a computer-implemented process for comparing a target content against a pool of contents. The process includes constructing an automata data structure based on the fingerprints in the pool. Context offset sequences of a target fingerprint are scanned against the automata data structure to determine matched offset subsequences.

Other embodiments, aspects and features are also disclosed.

BRIEF DESCRIPTION OF DRAWINGS

The disclosed embodiments have other advantages and features which will be more readily apparent from the following detailed description and the appended claims, when taken in conjunction with the accompanying drawings, in which:

FIG. 1 (consisting of FIGS. 1A and 1B) is a flow chart of a procedure for content fingerprinting using context offset sequences in accordance with an embodiment of the invention.

DETAILED DESCRIPTION

Definitions

As defined herein, "content" refers to the files or other digital objects that contain structured or unstructured text. For example, content may take the form of a Microsoft Office document, a web page including HTML and scripts, an electronic mail message, a PDF document, or a binary executable file (considered as structured text containing a sequence of CPU code instructions).

As further defined herein, "context" refers to the basic components which together form the content. For example, context may take the form of words or characters, HTML tags, program constructs, or instruction codes.

Conventional Content Fingerprinting

Content fingerprinting technology generally involves a procedure to map content of various types and sizes to a much more compact (shorter) bit string (digital fingerprint). The digital fingerprint which is output by the content fingerprinting uniquely identifies the original content for practical purposes. For example, in the field of Internet security, the digital fingerprint may be used to identify if a given Internet content is malicious or not by checking with the fingerprints of existing malicious content database.

Conventional fingerprinting technologies typically use cryptigraphical hash functions, such as MD5, SHA1, and CRC. These conventional technologies generally have the following intrinsic drawbacks. First, conventional fingerprinting technologies do not have resistance to context variation for the content in question. As defined herein, the "context" refers to the basic components which form the content. If the context of the content is changed, even slightly, the resultant fingerprint will usually be different. In other words, a given fingerprint is useful only in identifying the exactly same content, but not its variation. Second, conventional fingerprinting technologies are highly lossy. As such, one cannot infer or reverse back to the original content context from the generated fingerprints.

The present application discloses an innovative content fingerprinting technology that effectively identifies content in a way that provides content variance resistance (i.e. similarity detection). This is a useful feature, particularly in the content security domain, since malicious content changes or evolves over time in order to effectively bypass content filters. In addition, the content fingerprinting technology disclosed herein provides a useful capability to reproduce, or approximately reproduce, the original content from the digital fingerprint.

Content Fingerprinting Using Context Offset Sequences

The present application discloses the utilization of context offset sequences for content fingerprinting. Furthermore, the present application discloses the use of a suffix automata data structure containing context offset sequences for matching an input content against a fingerprint or pool of fingerprints.

In accordance with an embodiment of the invention, a content fingerprint comprises one or more sequences of context offset values. A context offset value is computed as the distance between two successive instances of a context component.

Figure 1A:
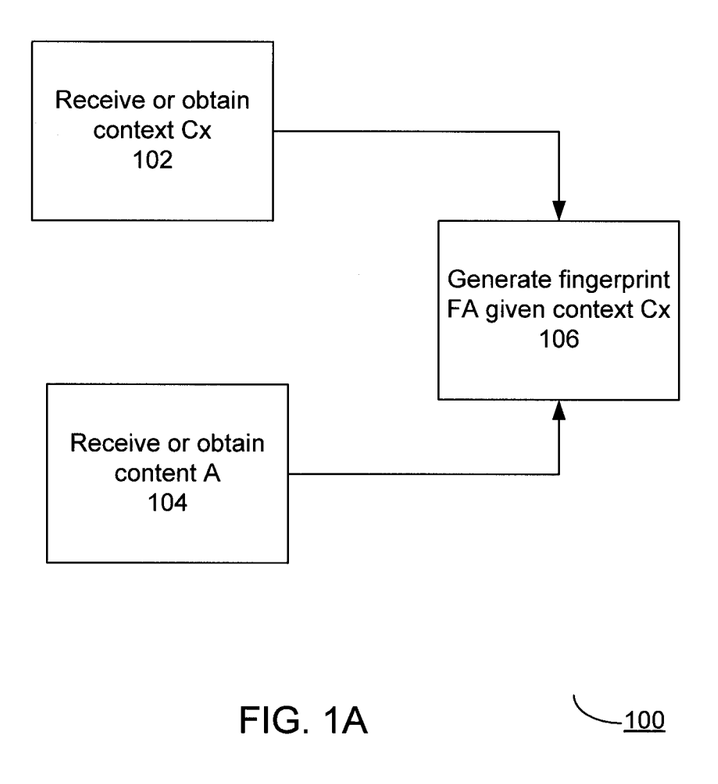
Figure 1B:
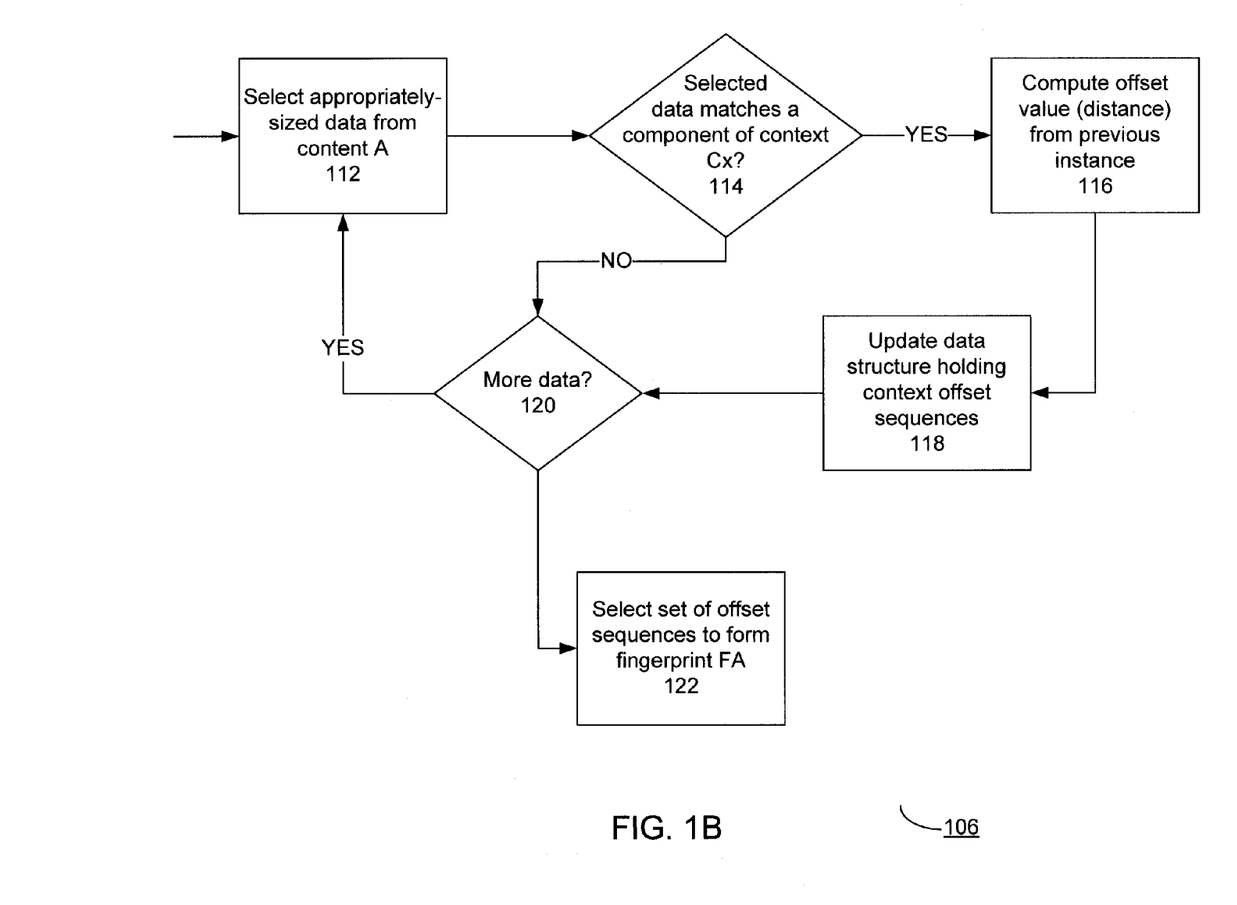

FIG. 1 (consisting of FIGS. 1A and 1B) is a flow chart of a procedure 100 for content fingerprinting using context offset sequences in accordance with an embodiment of the invention. As shown in FIG. 1A, context Cx is obtained (102), and content A is obtained (104). The context Cx comprises a set of context components for use in generation of the content fingerprint. The content A comprises a data sequence which may include instances of the context components. A fingerprint FA of content A is then generated (106) given the context Cx.

FIG. 1B shows an expanded procedure for the step of generating (106) a fingerprint FA of content A based on the context Cx in accordance with an embodiment of the invention. As shown, appropriately-sized data from the content A is selected (112), and a determination (114) is made as to whether the selected data matches a component of the context Cx. If the selected data does correspond to a context component, then a computation (116) is made as to the offset value (distance) from the previous instance of the same context component in the content A, and a data structure that holds the context offset sequences for the content fingerprint is updated (118) with the offset value. If there is more data in content A to process, then the procedure (106) continues by selecting (112) the next data from content A. Otherwise, the procedure (106) may select (120) a set of the offset sequences to form the fingerprint FA. All of the offset sequences may be selected to form a fingerprint which is capable of determining an exact match. A few or several of the offset sequences may be selected to form a more compact fingerprint.

In an exemplary embodiment, the offset values may be represented by integer values. In the case of an initial instance of a context component, i.e. no preceding instance of the context component in the content, then the context offset value may be defined as the distance relative to the beginning (i.e. relative to the 0 position) of the content in question. In addition, since the context offset values are relatively small in most cases, the context offset values may be typically represented by one-byte integers (or even less bits than one byte in some applications). The small size of the offset values results in small and efficient fingerprints.

Consider the following specific example. In this example, the content is in plain text, and the context for generating fingerprints comprises all the letters in the English alphabet. The content in this specific example is: "according to the statistics costa rica is the perfect destination for your retirement plans there are more americans living there than in any other country outside the u.s maybe its time for you to learn more about costa rica."

Given the above-specified content and context, the offset sequence for letter "a" is 1, 19, 13, 5, 23, 28, 10, 9, 6, 19, 6, 35, 27, 9, 10, 5. This is because the first occurrence of "a" in "according" is at position 1. The distance between the first "a" in "according" and the second "a" in "statistics" is 19 (the length of the string "ccording to the sta"). And so on. The number of occurrences of "a" (the element count of the generated offset sequence) is 16. The following table (Table 1) gives several of the computed offset sequences for the above specified content and context.

TABLE 1

| Letter (context component) | Offset sequence | Number of occurrences |
|---|---|---|
| "a" | 1, 19, 13, 5, 23, 28, 10, 9, 6, 19, 6, 35, 27, 9, 10, 5 | 16 |
| "e" | 16, 29, 3, 3, 5, 21, 4, 2, 12, 2, 4, 5, 4, 17, 2, 17, 17, 4, 10, 9, 14, 8 | 22 |
| "c" | 2, 1, 23, 3, 8, 15, 61, 36, 67, 8 | 10 |
| "o" | 4, 8, 18, 34, 4, 4, 32, 39, 7, 7, 32, 4, 4, 9, 6, 5 | 16 |
| "r" | 5, 30, 14, 20, 5, 2, 4, 16, 4, 5, 6, 17, 19, 7, 36, 12, 5, 15 | 18 |
| "i" | 7, 15, 3, 11, 4, 19, 4, 16, 33, 7, 2, 15, 25, 18, 5, 39 | 16 |

After generating the context offset sequences for the content, some or all of the context offset sequences may be used to form the content fingerprint. In one embodiment, the content fingerprint may include all of the context offset sequences. Such a content fingerprint with all context offset sequences may be used to find an exact match to the content because only the exact same content would have the exact same fingerprint. It may also be used to find approximate matches to the content because approximately matching content would have a nearly matching fingerprint.

In another embodiment, a few or several representative context offset sequences may be selected to form the content fingerprint. In this case, the content fingerprint may be used to find approximate matches to the content. For instance, given the above-specified example, those offset sequences with highest number of occurrences, such as "a", "e", "o", "r", and "i", may be selected since those letters may be considered more important than others in the specified content.

The identification of the context offset sequences to be selected for the content fingerprint may depend substantially on the types of content and the context for a given target application. One of the advantageous features of the fingerprinting technology disclosed herein is that it is very flexible and is adaptable to various types of content and context for a variety of target applications.

The sensitivity of the resultant fingerprints may be advantageously configured, tuned, and tailored for the target applications. Consequently, the fingerprinting technology disclosed herein turns out to be very useful in data leakage prevention, pattern matching, content similarity detection, and content classification applications.

Continuing from the previous example, if only the offset sequences of the letters "a", "e", "o", "r", and "i" are selected to form the fingerprint, the resultant fingerprint may identify all contents having the following skeleton sequence, where "." represents any printable characters other than the selected letters "a", "e", "o", "r", and "i": "a..or.i....o...e...a.i..i.... o..a.ri.a.i....e..er.e....e..i.a.ion. .or..o.r.re.ire.e.....a.....ere..re.o- re.a.eri.a....i.i.....ere.     ..a..i..a...o..er..o.n.r..o...i.e...e......a..e.i....i.e..or..o...o .ear...ore.a.o...o..a.ri.a."

Again continuing from the previous example, another advantageous feature of the context-offset-sequence fingerprinting technology is that the original content may be exactly or approximately regenerated from the corresponding fingerprints. The original content may be exactly regenerated if all context components of the content are used to generate the fingerprint. The original content may be approximately (partially) regenerated if only some of the context components of the content are used to generate the fingerprint.

Each context offset sequence is an ordered list of one or more offset values, where the offset values and their order are preserved from the given content. It is the distance between two successive context components that determines the offset values, not the position value of each individual context component. An advantage of using such offset values is that offset (relative) values tend to have a smaller footprint size than position (absolute) values. In other words, less bytes or bits may be used to represent a single offset value than a single position value. More importantly, the offset-based approach advocated herein has a much stronger resistance to content variation than a position-based approach.

Consider the content in previous example, but with variations indicated as follows by the bold and underlined characters: "according to the statistics costa rica is the ideal destination for your retirement plans there are more americans staving there than in any other country outside the u.s maybe its time for you to understand more about costa rica."

The corresponding letter offset sequences are shown below in Table 2, where differences in offset values compared with Table 1 are indicated by bold and underlined numbers:

TABLE 2

| Letter (context component) | Offset sequence | Number of occurrences |
|---|---|---|
| "a" | 1, 19, 13, 5, 12, 9, 28, 10, 9, 6, 6, 14, 6, 35, 32, 9, 10, 5 | 18 |
| "e" | 16, 29, 4, 5, 21, 4, 2, 12, 2, 4, 5, 4, 18, 2, 17, 17, 4, 10, 9, 16, 11 | 21 |
| "c" | 2, 1, 23, 3, 8, 73, 37, 72, 8 | 9 |
| "o" | 4, 8, 18, 32, 4, 4, 32, 40, 7, 7, 32, 4, 4, 14, 6, 5 | 16 |
| "r" | 5, 30, 32, 5, 2, 4, 16, 4, 5, 6, 18, 19, 7, 36, 13, 9, 15 | 17 |
| "i" | 7, 15, 3, 11, 4, 7, 10, 4, 49, 10, 15, 25, 18, 5, 44 | 16 |

Comparing tables 1 and 2, there are still significant portions (subsequences) of the offset sequences that are overlapping between tables 1 and 2. This results in a high similarity of the two different contents. This makes sense since the second content is the variation of the first content. For example, consider the offset sequence for the letter "e". Although the content from which the offset sequence for the letter "e" was generated has been modified in going from Table 1 to Table 2, there are still three offset subsequences (factors) from Table 1 that are intact in Table 2. The first intact subsequence is 16, 29, the second intact subsequence is 21, 4, 2, 12, 2, 4, 5, 4, and the third intact subsequence is 2, 17, 17, 4, 10, 9. Hence, the majority of the offset sequence for the letter "e" is the unchanged from Table 1 to Table 2.

Note that the fingerprinting technology disclosed herein is capable of not only determining which portions of two offset sequences are the same. It is also capable of identifying which portions of the offset sequences are different or modified. This information may be advantageously used to pinpoint changes made to content or differences between contents.

While the above discussion utilizes an example where content is in plain text and the context is letters, the fingerprinting technology disclosed herein may be applied to various types of content and other types of context. Consider, for example, structured content comprising a webpage in hypertext markup language (HTML) where HTML tags are used as the context for generating fingerprints. In this particular example, a publicly available web page is obtained and only the HTML tags within the <body>tag elements are retained for the content. The result is the following content comprising an HTML tag sequence:

<div><nobr><b></b><a></a><a></a><a></a><a></a><a></a><a></a><a><u></u><small></small></a><div><a></a><a></a><a></a><a></a><div><div></div></div><di v><a></a><a></a><a></a><a></a><a></a><a></a><a><div><div></div></div><a></a><a></a></div></a><nobr></div><div></div><div></div><div><nob r><a></a></nobr></div><center><br><div><div></div></div><br><form><table><tr><td></td><td><input><input><br><input><input></td><td><font><a></a><br><a></a><br><a></a></font></td></tr></table></for m><br><span><font><b></b><a></a></font></span><br><br><font><a></a></font><br><br><br><font><a></a><a></a><a></a></font><p><font><a></a></font></p></center>

From the above HTML tag sequence, the following offset sequences for the <div>, </div>, <a>, and </a>tags may be generated.

TABLE 3

| Tag | Offset sequence | Number of occurrences |
|---|---|---|
| <div> | 1, 20, 7, 1, 15, 1, 10, 2, 2, 8, 1 | 11 |
| </div> | 30, 1, 15, 1, 5, 2, 2, 2, 6, 5, 1 | 11 |
| <a> | 5, 2, 2, 2, 2, 2, 7, 2, 2, 6, 2, 2, 2, 2, 2, 6, 2, 11, 25, 3, 3, 12, 7, 7, 2, 5 | 26 |
| </a> | 6, 2, 2, 2, 2, 6, 3, 2, 2, 2, 6, 2, 2, 2, 2, 2, 6, 2, 11, 25, 3, 3, 12, 7, 7, 2, 2, 5 | 26 |

The above-discussed examples show how the fingerprinting technology disclosed herein may be flexibly applied to various types of content and may use different types of context. The section below discloses a computer-implemented method and apparatus which may be used to compare context-offset-sequence-based fingerprints in an automated manner.

Suffix Automata for Comparing Content Fingerprints Based on Context Offset Sequences In accordance with an embodiment of the invention, "suffix automata" may be utilized to compare the above-described content fingerprints. As used herein, a suffix automaton for a context offset sequence may be defined as a finite automaton (or finite state machine) that accepts all suffixes of the context offset sequence. As discussed above, the context offset sequence may comprise a sequence of integers. In an exemplary implementation, a suffix automaton may be the smallest finite automaton that accepts all suffixes of a context offset sequence.

The data structure for the suffix automata for a fingerprint should effectively contain the information from all of the context offset sequences in the fingerprint. In accordance with an embodiment of the invention, a suffix automaton (finite state machine) may correspond to a context component, the transitions between states of the suffix automaton may represent offset values for the context component, and the states of the suffix automaton may correspond to subsequences of the offset sequence for the context component.

Two classes of content fingerprint information may be represented by a suffix automaton: (i) the context offset sequence as a whole, and (ii) the subsequences (factors) of the context offset sequence, including prefix, suffix, and subsequences in between. For instance, the suffix automaton for the context offset sequence "1, 2, 2, 3" presents the following information:

The whole offset sequence: 1=>2.=>2=>3.
The offset sequence prefixes: 1, 1=>2, 1=>2=>2.
The offset sequence suffixes: 2=>2=>3, 2=>3, 3.
The subsequences in between: 2=>2, 2.

Figure 2:
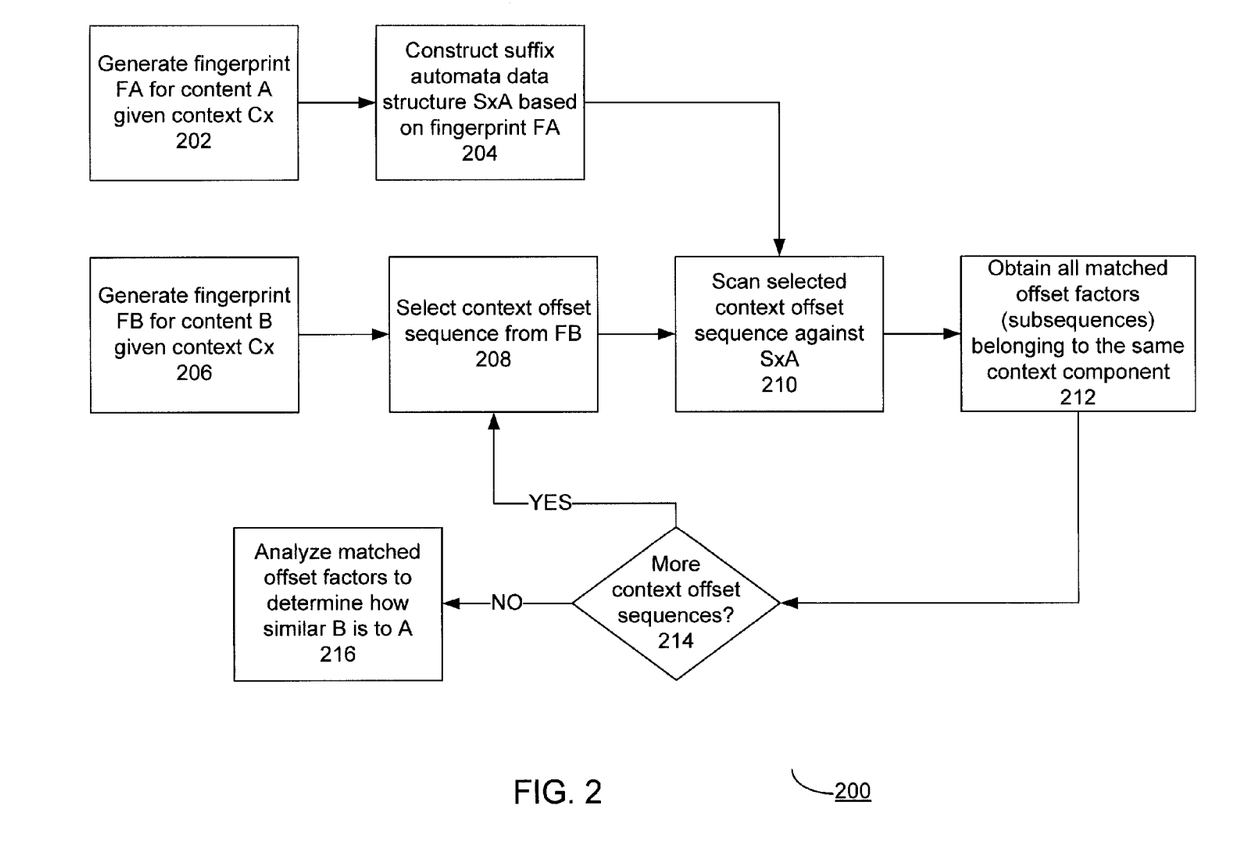
FIG. 2 is a flow chart of a procedure for comparing two contents in accordance with an embodiment of the invention.

FIG. 2 is a flow chart of a procedure 200 for comparing two contents A and B (to check if B is the same as A or how similar B is compared with A) in accordance with an embodiment of the invention. As shown, a fingerprint FA may be generated (202) for content A given context Cx. As described above, the fingerprint FA contains context offset sequences derived from the content A. Then, given the fingerprint FA, suffix automata SxA may be constructed (204) based on all the context offset sequences in fingerprint FA. Offset values and context component attributes are recorded in the transitions and states, respectively, of the suffix automata.

Given the same context Cx, the fingerprint FB for content B may be generated (206). Then, each context offset sequence in FB is selected (208) for scanning (210) against the suffix automata SxA. As a result, all matched offset factors (subsequences) belonging to the same context component are obtained (212). The scanning (210) and matching (212) against the suffix automata SxA continues while there are more (214) context offset sequences in fingerprint FB to process.

When all the context offset sequences in fingerprint FB have been scanned (210) and matched (212) against the suffix automata SxA, then a computer-implemented analysis of the matched offset factors is performed (216) to determine how similar content B is to content A (or in the extreme case, whether content B is the exact same as content A). In other words, the computer-implemented analysis of the matched offset factors determines a relationship between the two contents A and B. Essentially, the more and the longer that factors match, the more similar are the two contents. In an extreme case, two contents are identical if all the context offset sequences are exactly matched (and if the fingerprints were formed by selecting all the context offset sequences).

In accordance with an embodiment of the invention, the computer-implemented analysis (216) may utilize a sum of lengths of the matched offset factors to determine a level of matching between content B and content A. For example, consider content A to have fingerprint (FA) which has the context offset sequence 1, 19, 13, 5, 23, 28, 10, 9, 6, 19, 6, 35, 27, 9, 10, 5, and consider content B to have fingerprint (FB) which has the context offset sequence 1, 19, 13, 5, 12,9, 28, 10, 9, 6, 6,14, 6, 35, 32, 9, 10, 5, with difference noted in bold and underline. The computer-implemented analysis may determine that the total length of the original fingerprint (FA) is 16 and, after matching against FB, the matched fingerprint subsequences are "1, 19, 13, 5", "28, 10, 9, 6", "6, 35", and "9, 10, 5", and the total length of the matched subsequences (matched offsets) is 4+4+2+3=13. This total length of matched subsequence may be divided by the length of the sequence of FA, in this case 16, to obtain a matching fraction 13/16=0.8125.

A threshold TX may then be applied to the matching fraction to determine if the level of matching is sufficient to pass the threshold. If the matching fraction passes the threshold, then a match is found. For example, if TX=0.8, then a match would be found in the above example. However, if TX=0.9, then a match would not be found in the above example.

The flexibility of the fingerprinting technology using context offset sequences advantageously enables the comparison process to be readily customized to various target applications. For example, the comparison process may be adapted to any suitable scoring or similarity measurement function depending upon the target application.

Figure 3:
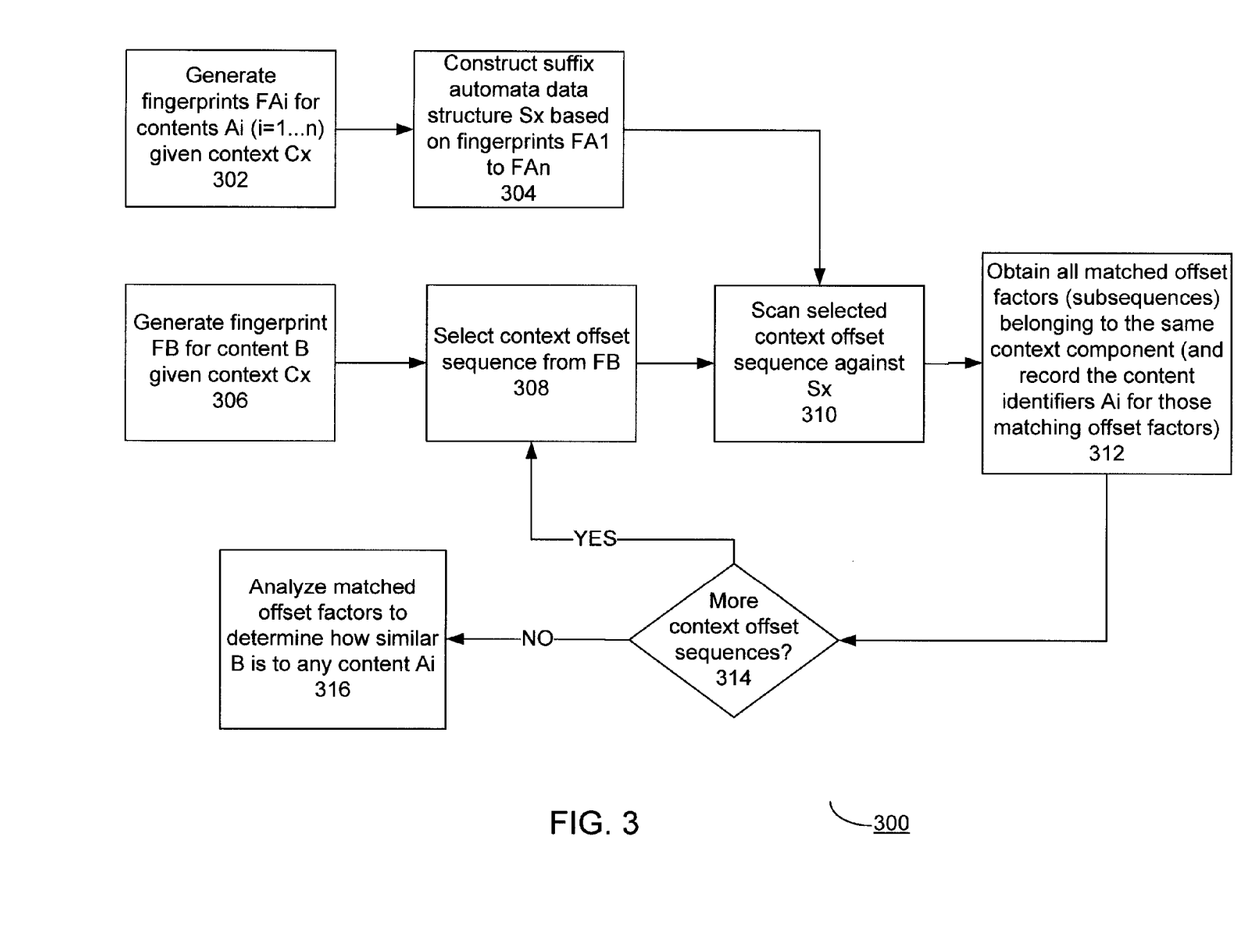
FIG. 3 is a flow chart of a procedure for comparing an input content against a pool of multiple contents in accordance with an embodiment of the invention.

While FIG. 2 provides a method 200 of comparing a given input content B against a single content A, FIG. 3 provides a method 300 of comparing a given input content B against a set of multiple contents Ai, where i=1 . . . n. The method 300 shown in FIG. 3 has various real-world applications. For example, one may want to compare a given input content against a pool of two or more fingerprinted contents so as to check for near or exact matches.

As shown in FIG. 3, a plurality of fingerprints FAi (i=1 . . . n) may be generated (302) for contents Ai (i=1 . . . n) given context Cx. As described above, each fingerprint FAi contains context offset sequences derived from the corresponding content Ai. Then, given the plurality of fingerprints FAi (i=1 . . . n), suffix automata Sx may be constructed (304) based on all the context offset sequences for all the fingerprints FAi (i=1 . . . n). Offset values and context component attributes are recorded in the transitions and states, respectively, of the suffix automata, and the transitions and states are associated with the corresponding content identifier Ai.

Given the same context Cx, the fingerprint FB for content B may be generated (236). Then, each context offset sequence in FB is selected (308) for scanning (310) against the suffix automata Sx. As a result, all matched offset factors (subsequences) belonging to the same context component are obtained (and the content identifiers Ai for those matching offset factors are recorded) (312). The scanning (310) and matching (312) against the suffix automata Sx continues while there are more (314) context offset sequences in fingerprint FB to process.

When all the context offset sequences in fingerprint FB have been scanned (310) and matched (312) against the suffix automata Sx, then a computer-implemented analysis of the matched offset factors is performed (316) to determine how similar content B is to any content Ai (i=1 . . . n) (or in the extreme case, whether content B is the exact same as any content Ai). In other words, the computer-implemented analysis of the matched offset factors determines a relationship between the content B and each of the contents Ai (i=1 . . . n). Essentially, content B is more similar to content Ai when the matching factors between the two are longer and when there are more matching factors. In an extreme case, content B and content Ai are identical if all the context offset sequences are exactly matched (and if the fingerprints were formed by selecting all context offset sequences).

In accordance with an embodiment of the invention, the computer-implemented analysis (316) may utilize a sum of lengths of the matched offset factors to determine a level of matching between content B and each content Ai. See above discussion of the computer-implemented analysis (216) in relation to FIG. 2.

Time Complexity

The time complexity of the above-discussed content fingerprinting technology is advantageously linear. In other words, the time complexity is O(n), where n is the content size when generating a fingerprint, and where n is the fingerprint size when comparing fingerprints.

When generating content fingerprints by a given context, the algorithm process parses the whole content and picks up the context offset values along the way. Therefore, the time complexity is linear to the size of input content, O(n), assuming that the update of offset value sequence for a particular context is constant O(1) during the algorithm execution.

When comparing content fingerprints, the algorithm process scans all the context offset sequences of an input fingerprint against a constructed suffix automata. Therefore, the time complexity is linear to the overall size of the context offset sequences of the fingerprint, i.e. the size of the fingerprint.

Therefore, the overall time complexity of the fingerprinting technology is linear, i.e. O(n), which results in very efficient technology suitable for most of applications with large pool of contents.

Example Computer Apparatus

Figure 4:
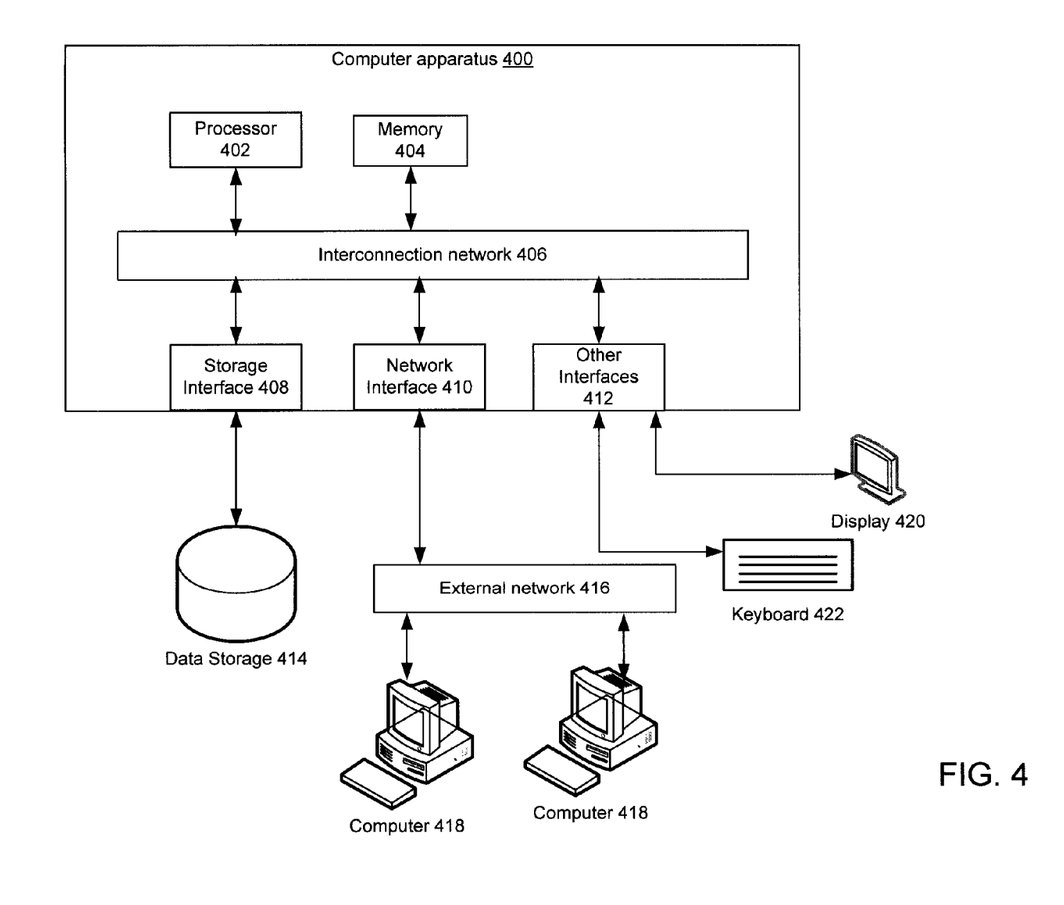
FIG. 4 is a schematic diagram depicting an example computer apparatus which may be configured to perform various method steps in accordance with an embodiment of the invention.

FIG. 4 is a schematic diagram depicting an example computer apparatus 400 which may be configured to perform various method steps in accordance with an embodiment of the invention. Other designs for the computer apparatus may be used in alternate embodiments. As discussed above, embodiments of the present invention may be performed by multiple computer apparatus 400 communicatively interconnected by a network.

As shown in FIG. 4, the computer apparatus 400 comprises a processor 402, a computer-readable memory system 404, a storage interface 408, a network interface 410, and other interfaces 412. These system components are interconnected through the use of an interconnection network (such as a system bus or other interconnection system) 406. The memory 404 may be configured to include, in addition to other components and data, processor-executable instructions to perform various method steps disclosed herein.

The storage interface 408 may be used to connect storage devices 414 to the computer apparatus 400. The network interface 410 may be used to communicate with other computers 418 by way of an external network 416. The other interfaces may interface to various devices, for example, a display 420, a keyboard 422, and other devices.

Example Information Leakage Prevention System

Figure 5:
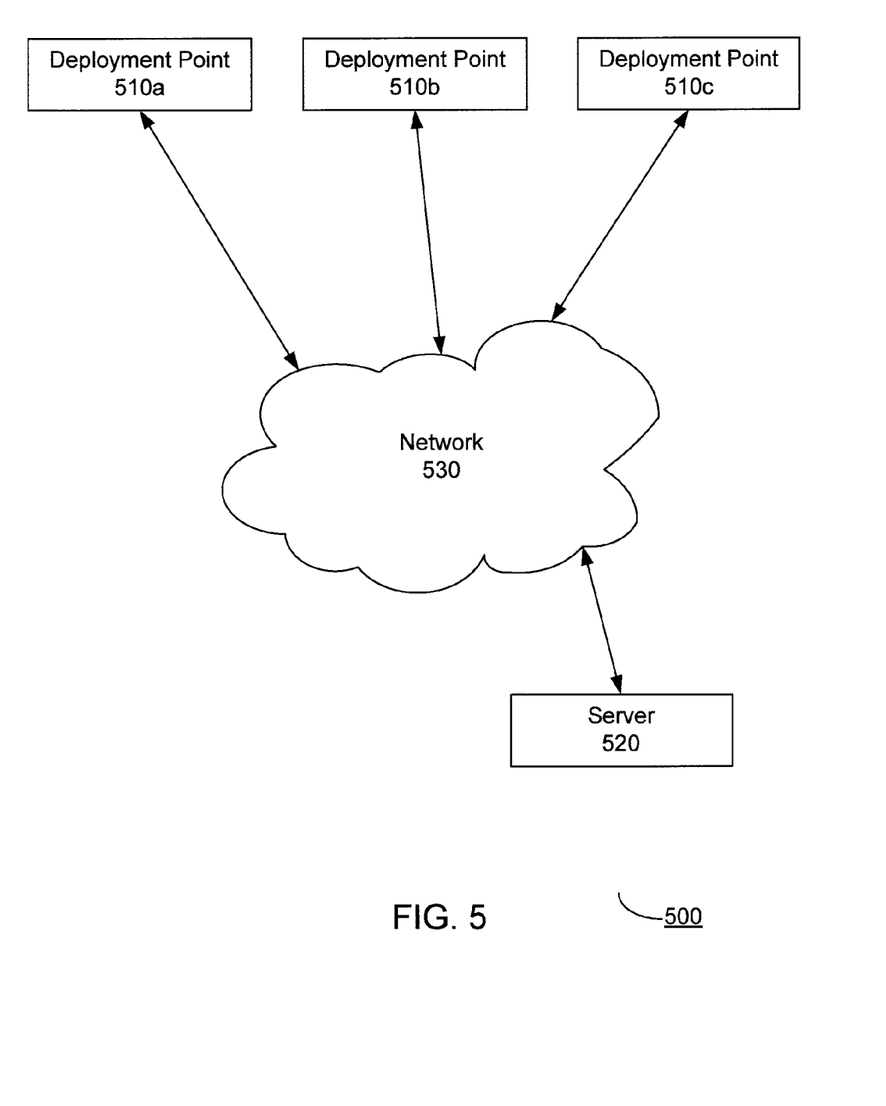
FIG. 5 is a high-level schematic diagram of an enterprise sensitive information management system in accordance with an embodiment of the present invention.

FIG. 5 is a high-level schematic diagram of an enterprise sensitive information management (or information leakage prevention) system 500 in accordance with an embodiment of the present invention. The system 500 monitors and manages sensitive information in an enterprise network. The system 500 includes deployment points 510a-c and a server 520. Each of the deployment points 510 can be a computer (e.g., laptop computers, desktop computers), or a device with data access capabilities (e.g., handheld computing devices, embedded devices with a processor and operating or control system), or a network appliance or device through which network traffic flows and may be inspected (e.g., a network gateway, etc.). The server 520 is a computing device that, in accordance with an embodiment of the invention, may perform a fingerprint deployment process. In the fingerprint deployment process, generated fingerprints are distributed from the server 520 to the deployment points 510.

The deployment points 510 and the server 520 are connected through a network 530. The network 530 may be a wired or wireless network or a combination thereof. Examples of the network 530 include the Internet, an intranet, a cellular network, or a combination thereof. It is noted that each of the deployment points 510 and the server 520 are structured to include a processor, memory, storage, network interfaces, and applicable operating system and other functional software (e.g., network drivers, communication protocols, etc.).

Figure 6:
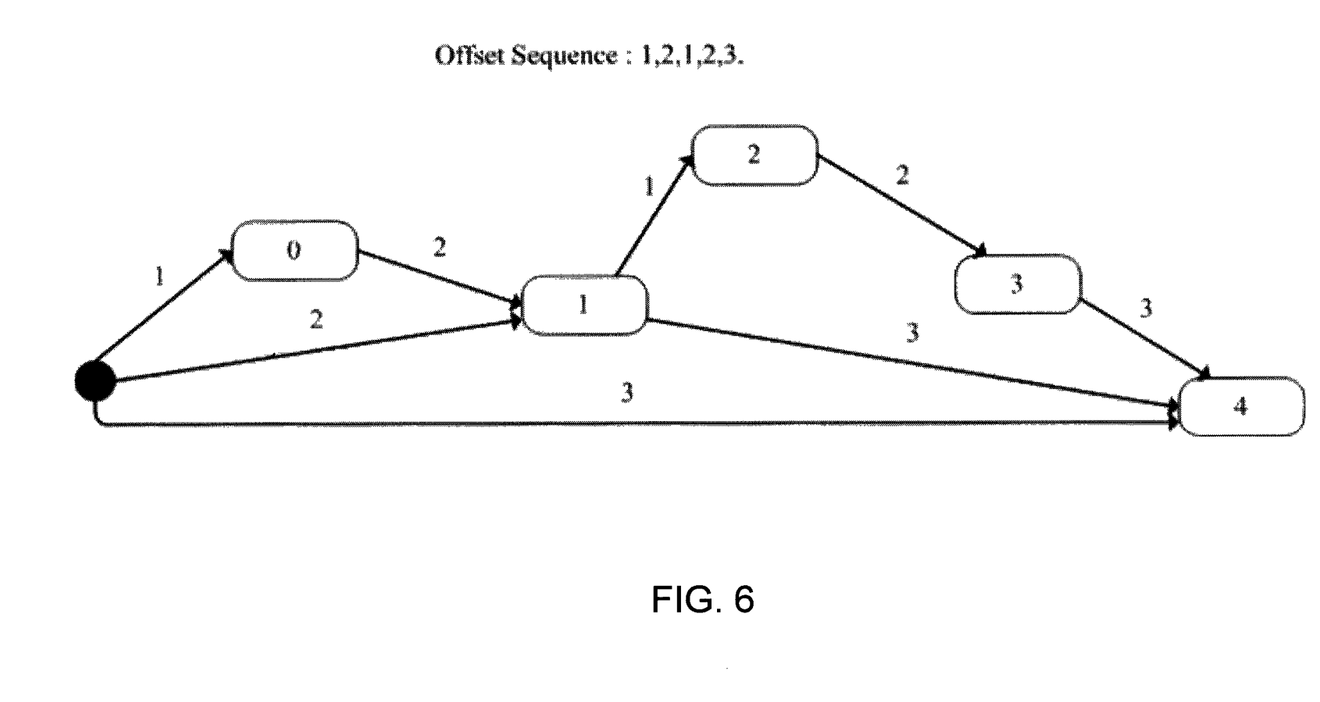
FIG. 6 depicts a suffix automaton for an example offset sequence in accordance with an embodiment of the present invention.

FIG. 6 depicts a suffix automaton for an example offset sequence in accordance with an embodiment of the present invention. The example offset sequence is 1, 2, 1, 2, 3. This is a simple example for purposes of explanation and practical applications are anticipated to have much more complex offset sequences. Each node corresponds to a state. A set of state information is kept for each state, including a state identifier (state id). The transitions of the suffix automaton are shown by the arrows between the nodes. Each transition or arrow is labeled by a corresponding offset number.

The suffix automaton shown is the minimal automaton that accepts the set of suffixes of the offset sequence 1, 2, 1, 2, 3. The suffix automaton provides a structure for a machine to search for factors (sub-sequences) of the offset sequence inside of other offset sequences.

For example, consider a second offset sequence, such as 1, 2, 3, 2, 3. If we do exact matching, then the two offset sequences are simply determined not to match. However, using the suffix automaton shown in FIG. 6 for the first offset sequence (1, 2, 1, 2, 3), factor matching is enabled. Hence, matching factors are found, such as 1, 2 and 2, 3. In other words, the suffix automaton provides for a more detailed factor matching to compare sequences.

Furthermore, applicants note that the construction of the suffix automata for offset sequences in accordance with an embodiment of the invention scales linearly in time on a fixed alphabet. In addition, the size of the suffix automata scales linearly with the length of the input sequence.

CONCLUSION

The features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Upon reading this disclosure, those of skill in the art will appreciate still additional alternative structural and functional designs for a system and a process for a matching engine to query relevant documents, which may include a signature generation and relevance detection through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer-implemented process of content fingerprinting, the process comprising:
   receiving a context, wherein the context comprises a set of context components for use in generation of content fingerprints;
   receiving content for fingerprinting, wherein the content includes instances of at least one of the context components;
   processing the content to generate context offset sequences, wherein a context offset sequence comprises a sequence of offset values, each offset value corresponding to a distance to a next occurrence of a context component within a content; and
   forming a fingerprint for the content from at least a portion of the context offset sequences.

2. The computer-implemented process of claim 1, wherein said processing of the content comprises:
   identifying instances of a context component in the content.

3. The computer-implemented process of claim 2, wherein said processing of the content further comprises:
   computing an offset value between each instance of the context component and a preceding instance of the context component.

4. The computer-implemented process of claim 3, wherein said processing of the content further comprises:
   updating a data structure holding the context offset sequences with said computed offset value for said context component.

5. The computer-implemented process of claim 4, wherein all the context offset sequences are selected to form the fingerprint.

6. The computer-implemented process of claim 4, wherein selection of the context offset sequences to form the fingerprint is biased towards longer sequences.

7. An apparatus for content fingerprinting, the apparatus comprising:
   a processor configured to execute computer-readable instructions;
   memory configured to store data, including said computer-readable instructions; and
   a communications system interconnecting said processor and memory,
   wherein said computer-readable instructions are configured to (i) receive a context comprising a set of context components for use in generation of content fingerprints, (ii) receive a content for fingerprinting which includes instances of at least some of the context components, (iii) process the content to generate context offset sequences, wherein a context offset sequence comprises a sequence of offset values, each offset value corresponding to a distance to a next occurrence of a context component within a content, and (iv) form a fingerprint for the content from at least a portion of the context offset sequences.

8. The apparatus of claim 7, wherein said computer-readable instructions configured to process the content includes computer-readable code to identify instances of a context component in the content.

9. The apparatus of claim 8, wherein said computer-readable instructions configured to process the content includes computer-readable code to compute an offset value between each instance of the context component and a preceding instance of the context component.

10. The apparatus of claim 9, wherein said computer-readable instructions configured to process the content includes computer-readable code to update a data structure holding the context offset sequences with said computed offset value for said context component.

11. The apparatus of claim 10, wherein said computer-readable instructions configured to process the content includes computer-readable code to select all the context offset sequences to form the fingerprint.

12. The apparatus of claim 10, wherein said computer-readable instructions configured to process the content includes computer-readable code to select the context offset sequences to form the fingerprint with a bias towards longer sequences.

13. A computer-implemented process of comparing a target content against a pool of contents, the process comprising:
    generating fingerprints for each content in the pool given a context, wherein the fingerprints comprise context offset sequences;
    constructing an automata data structure based on the fingerprints;
    generating a target fingerprint for the target content given the same context, wherein the target fingerprint also comprises context offset sequences, wherein a context offset sequence comprises a sequence of offset values, each offset value corresponding to a distance to a next occurrence of a context component within a content; and
    scanning the context offset sequences of the target fingerprint against the automata data structure to determine matched offset subsequences.

14. The process of claim 13, wherein the context offset sequences are generated by identifying instances of a context component in the content and computing an offset value between each instance of the context component and a preceding instance of the context component.

15. The process of claim 14, further comprising:
    analyzing matched offset subsequences to determine a level of similarity between the target content and each content in the pool.

16. An apparatus for comparing a target content against a pool of contents, the apparatus comprising:
    a processor configured to execute computer-readable instructions;
    memory configured to store data, including said computer-readable instructions; and
    a communications system interconnecting said processor and memory, wherein said computer-readable instructions are configured to (i) generate fingerprints for each content in the pool given a context, wherein the fingerprints comprise context offset sequences, wherein a context offset sequence comprises a sequence of offset values, each offset value corresponding to a distance to a next occurrence of a context component within a content, (ii) construct an automata data structure including all the information in the fingerprints, (iii) generate a target fingerprint for the target content given the same context, wherein the target fingerprint also comprises context offset sequences, and (iv) scan the context offset sequences of the target fingerprint against the automata data structure to determine matched offset subsequences.

17. The apparatus of claim 16, further comprising computer-readable instruction code configured to generate the context offset sequences by identifying instances of a context component in the content and compute an offset value between each instance of the context component and a preceding instance of the context component.

18. The apparatus of claim 17, further comprising computer-readable instruction code configured to analyze matched offset subsequences to determine a level of similarity between the target content and each content in the pool.

* * * * *